US011009463B2

(12) United States Patent
York et al.

(10) Patent No.: US 11,009,463 B2
(45) Date of Patent: May 18, 2021

(54) FLUORESCENCE MICROSCOPY SYSTEM AND METHODS BASED ON STIMULATED EMISSION

(71) Applicant: CALICO LIFE SCIENCES LLC, South San Francisco, CA (US)

(72) Inventors: Andrew Gregory York, San Francisco, CA (US); Sanjay Ramesh Varma, Oakland, CA (US)

(73) Assignee: CALICO LIFE SCIENCES LLC, South San Francisco, CA (US)

( * ) Notice: Subject to any disclaimer, the term of this patent is extended or adjusted under 35 U.S.C. 154(b) by 26 days.

(21) Appl. No.: 16/604,701

(22) PCT Filed: Apr. 11, 2018

(86) PCT No.: PCT/US2018/027129
§ 371 (c)(1),
(2) Date: Oct. 11, 2019

(87) PCT Pub. No.: WO2018/191392
PCT Pub. Date: Oct. 18, 2018

(65) Prior Publication Data
US 2020/0378895 A1     Dec. 3, 2020

Related U.S. Application Data

(60) Provisional application No. 62/484,171, filed on Apr. 11, 2017.

(51) Int. Cl.
*G02B 21/16* (2006.01)
*G01N 21/64* (2006.01)
*G02B 21/24* (2006.01)

(52) U.S. Cl.
CPC ......... *G01N 21/6458* (2013.01); *G02B 21/16* (2013.01); *G02B 21/241* (2013.01); *G01N 2021/6478* (2013.01)

(58) Field of Classification Search
CPC ............... G02B 21/16; G01N 21/6458; G01N 2021/6478
See application file for complete search history.

(56) References Cited

U.S. PATENT DOCUMENTS

2011/0284767 A1* 11/2011 Wolleschensky ...... G02B 27/58
250/459.1
2016/0123887 A1    5/2016 York et al.

OTHER PUBLICATIONS

Anonymous, "Phase-contrast microscopy" (Feb. 16, 2017); XP055490086, URL: https://web.archive.org/web/20170216181552/https://en.wikipedia.org/wiki/phase-contrast_microscopy, Retrieved: Apr. 7, 2018.
(Continued)

*Primary Examiner* — David P Porta
*Assistant Examiner* — Fani Boosalis
(74) *Attorney, Agent, or Firm* — Lando & Anastasi, LLP

(57) ABSTRACT

Fluorescence imaging based on stimulated emission. In one example a system includes an excitation source (110) that excites fluorescent markers (122) in a sample (120) with an excitation beam (112), a stimulation source (130) that stimulates the excited fluorescent markers (122) to produce stimulated emission (124), and an objective lens (150) that receives the stimulation beam (132) and the stimulated emission (124). The system further includes a phase shifting and attenuation apparatus (200) configured to receive the stimulation beam (132) and the stimulated emission (124) from the objective lens (150), to attenuate the stimulation beam (132), and to induce a relative phase shift between a reference beam (optionally being at least a portion of the stimulation beam) and the stimulated emission, thereby causing constructive interference between the reference beam and the stimulated emission. The system further includes an optical apparatus (300) configured to focus the stimulated emission onto an image plane, and a detector
(Continued)

(140) positioned at the image plane and configured to image the stimulated emission.

37 Claims, 7 Drawing Sheets

(56) References Cited

OTHER PUBLICATIONS

Anonymous, "Phase Contrast Microscopy", Wikipedia, pp. 1-6 (Feb. 2, 2009); XP002523792, URL: http://en.wikipedia.org/wiki/phase_contrast_microscopy, Retrieved: Apr. 16, 2009.

Min, Wei et al., "Coherent Nonlinear Optical Imaging: Beyond Fluorescence Microscopy", Annual Review of Physical Chemistry, vol. 62, No. 1, pp. 507-530 (May 5, 2011); XP055489407, ISSN: 0066-426X, DOI: 10.1146/annurev.physchem.012809.103512.

Varma, Sanjay et al., "Stimulated Emission Imaging", Focus on Microscopy Annual Meeting (Jan. 1, 2015); XP055490106, URL: http://www.focusonmicroscopy.org/2017/PDF/1429_Varma.pdf.

Varma, Sanjay et al., "What is the Emission PSF of Stimulated Emission?", American Journal of Physics Pure and Applied Optics (Jan. 1, 2014); XP0554901047, URL: http://www.focusonmicroscopy.org/2015/PDF/586_York.pdf.

Wei, Lu et al., "What can stimulated emission do for bioimaging?", Annals of the New York Academy of Sciences, vol. 1293, No. 1, pp. 1-7 (Jul. 1, 2013); XP055489394, US ISSN: 0077-8923, DOI: 10.1111/nyas.12079.

\* cited by examiner

FLUORESCENCE MICROSCOPY SYSTEM AND METHODS BASED ON STIMULATED EMISSION

CROSS-REFERENCE TO RELATED APPLICATIONS

This application is a U.S. national phase application, and claims the benefit of priority under 35 U.S.C. § 371, of International (PCT) Patent Application Serial No. PCT/US2018/027129 titled "FLUORESCENCE MICROSCOPY SYSTEM AND METHODS BASED ON STIMULATED EMISSION" and filed on Apr. 11, 2018, which in turn claims the benefits under 35 U.S.C. § 119(e) and PCT Article 8 of U.S. Provisional Application No. 62/484,171 titled "FLUORESCENCE MICROSCOPY SYSTEM AND METHODS BASED ON STIMULATED EMISSION" and filed on Apr. 11, 2017, which is herein incorporated by reference in its entirety for all purposes.

BACKGROUND

A fluorescence microscope is an optical microscope that uses fluorescence (or phosphorescence) instead of, or in addition to, reflection and absorption to study properties of organic or inorganic substances. For example, fluorescence microscopy is an invaluable tool for biologists that provides high-resolution, high-speed, protein-specific imaging in living cells, tissues, and animals. Fluorescence microscopy uses markers (also referred to as fluorophores) which absorb light and spontaneously re-emit that light at a different wavelength. In particular, a specimen to be imaged is illuminated with light of a specific wavelength (or wavelengths) which is absorbed by the fluorophores, causing them to enter an excited electronic state. Spontaneous emission is the process by which the fluorophores in the excited state relax to the ground state through radiation (emission) of fluorescent light of longer wavelengths (i.e., of a different color) than the absorbed light. The illumination light is separated from the much weaker emitted fluorescence through the use of a spectral filter. The nanosecond-scale lag between absorption and spontaneous emission limits how much light a fluorescent marker emits per second, which fundamentally limits the signal level ("brightness") and measurement speed. For example, seeing individual steps of a RNA polymerase as it moves along a DNA strand requires a marker that emits thousands of photons per millisecond, much more than typical fluorescent proteins can produce through spontaneous emission.

Spontaneous emission is not the only way for an excited fluorescent marker to emit light after absorption. If an excited marker is illuminated with light having an appropriate wavelength range (color), it can also be "stimulated" to emit. Since the rate of stimulated emission can be much faster than spontaneous emission, stimulated emission can be several orders of magnitude brighter than spontaneous emission. This offers an exciting possibility for improving fluorescent marker brightness. However, stimulated emission is difficult to distinguish from the stimulating light. Unlike the illumination light that induces spontaneous emission, which can be easily filtered because it is of a different color than the emitted light, the stimulating light is the same color, the same phase, the same polarization, as the stimulated emission, and, in bulk materials, propagates in the same direction. Noise and background from the stimulating beam is therefore difficult to reject, which negates the advantage of stimulated emission for increasing marker brightness.

SUMMARY OF THE INVENTION

Aspects and embodiments generally relate to fluorescence microscopy/imaging and in particular to systems and methods of distinguishing stimulated emissions as a mechanism for increasing the signal from fluorophores. Various embodiments of a fluorescence microscopy system that employs a technique for distinguishing stimulated emission so as to enhance signal strength of fluorescent markers in a sample for detection and imaging are disclosed. As such, greatly increasing the brightness and photostability of fluorescent markers may enable high speed, high precision imaging and measurements, as discussed further below. It is to be appreciated that although the terms "fluorescence microscopy," "fluorophores," "fluorescent markers" and "fluorescent molecules" are used throughout this disclosure for convenience and clarity of explanation, aspects and embodiments of the methods and systems disclosed herein are not limited to the use of fluorescence only and apply equally to phosphorescence and other luminescent markers and processes. As used herein the term fluorescence, and associated terms, is intended to refer to the absorption of electromagnetic radiation at one wavelength and its reemission at another, lower energy wavelength.

Certain embodiments of a stimulated emission imaging system include an excitation source to illuminate and excite a sample containing fluorescent markers, a stimulation source that generates the stimulation beam to cause stimulated emission in the sample, and an objective lens that focuses the stimulation beam onto a stimulation beam attenuator to attenuate the stimulation beam. In some examples the stimulation beam attenuator includes a beam block containing a pinhole aperture. In other examples the stimulation beam attenuator includes a gray filter. The system further includes a phase adjusting element, which can optionally be combined with the stimulation beam attenuator, that is configured to cause the stimulated emission and a reference beam (which may be a portion of the stimulation beam) to coherently interfere by altering the phase of either the reference beam or the stimulated emission, and thereby provide an enhanced signal for imaging. Further, the system includes an imaging detector, and optics configured to focus the enhanced signal onto the imaging detector such that the detector can produce an image of the sample. The optics can be configured to provide a desired level of magnification.

According to certain embodiments, a fluorescence-based imaging system includes an excitation source configured to generate an excitation beam along a first axis, a stimulation source configured to generate a stimulation beam along a second axis that is in perpendicular orientation relative to the first axis, the excitation beam and the stimulation beam having different wavelengths, a sample having a plurality of fluorescent markers which are illuminated by the excitation light beam such that the plurality of fluorescent markers assumes an excited state and then illuminated again by the stimulation light beam to generate a stimulated emission by the initially excited sample, and an objective lens oriented along the second axis and configured to capture and focus the stimulation beam and the stimulated emission emitted by the plurality of fluorescent markers. The system further includes a stimulation beam attenuator positioned at the back focal plane of the objective lens and configured to attenuate the stimulation beam while allowing the stimulated emission to pass, a phase adjusting component configured to phase-shift the stimulated emission relative to a reference beam (which is optionally the attenuated stimulation beam) to produce constructive interference between the reference beam and the stimulated emission, and a detector configured to image the stimulated emission.

In one example the excitation beam along the first axis is not captured by the objective lens. In another example the stimulation beam is collimated. In certain examples the fluorescence microscopy system further includes at least one lens positioned between the objective lens and the detector and configured to focus the stimulated emission onto the detector. In one example the at least one lens includes a first lens, a second lens, and a third lens, the first and second lenses being configured as an optical relay, and the third lens positioned and configured to receive the stimulated emission from the optical relay and to focus the stimulated emission onto the detector. In some examples the stimulation source and the excitation source each includes a laser. In one example the stimulation beam attenuator includes a gray filter. In another example the stimulation beam attenuator includes a beam block having a central pinhole aperture, the beam block being configured to block the majority of the light in the stimulation beam, while allowing a small amount to pass through the central pinhole aperture, thereby producing the attenuated stimulation beam. In one example the phase shifting component is configured to impart a fixed phase shift (or a particular number of degrees, for example 90°) to at least one of the stimulated emission and the reference beam. In another example the phase shifting component is rotatable or otherwise adjustable to accommodate varying wavelengths of the stimulated emission.

Further embodiments are directed to a method of fluorescence imaging based on stimulated emission, the method including acts of illuminating a plurality of fluorescent markers in a sample with an excitation beam from an excitation source oriented along a first axis such that the plurality of fluorescent markers assume an excited state, illuminating the plurality of fluorescent markers in the excited state with a stimulation beam from a stimulation source oriented along a second axis that is in perpendicular relation to the first axis, wherein a stimulated emission is generated by the one or more fluorescent markers when illuminated by the stimulation beam, and wherein the stimulated beam and the excitation beam have different wavelengths, focusing the stimulation beam and the stimulated emission through an objective lens, attenuating the stimulation beam with a stimulation beam attenuator positioned along the second axis after the objective lens to produce an attenuated stimulation beam, producing constructive interference between a reference beam (which is optionally the attenuated stimulation beam) and the stimulated emission by inducing a relative phase shift between the stimulated emission and the reference beam, and imaging the stimulated emission with a detector.

In certain examples the method further includes focusing the stimulated emission using a lens onto the detector. In some examples the method further includes relaying the stimulated emission from the objective lens to an additional lens, and focusing the stimulated emission onto the detector using the additional lens.

According to certain embodiments a fluorescence-based imaging system comprises an excitation source configured to generate an excitation beam to illuminate a sample containing a plurality of fluorescent markers, the excitation beam having a first wavelength in an absorption band of the plurality of fluorescent markers and configured to excite the plurality of fluorescent markers into an excited state, and a stimulation source configured to generate a collimated stimulation beam to further illuminate the sample, the stimulation beam having a second wavelength in an emission band of the plurality of fluorescent markers and configured to stimulate the plurality of fluorescent markers in the excited state to produce a stimulated emission. The system further comprises an objective lens constructed and arranged to receive the stimulation beam and the stimulated emission, a phase shifting and attenuation apparatus configured to receive the stimulation beam and the stimulated emission from the objective lens, to attenuate the stimulation beam, and to induce a relative phase shift between a reference beam (which may be the stimulation beam or a portion thereof) and the stimulated emission, thereby causing constructive interference between the reference beam and the stimulated emission, a detector configured to receive and image the stimulated emission, and an optical apparatus positioned between the objective lens and the detector and configured to focus the stimulated emission onto an image plane at the detector.

In certain examples the phase shifting and attenuation apparatus includes a phase adjusting plate having an attenuation region positioned at a back focal plane of the objective lens, the attenuation region being configured to attenuate the stimulation beam. The phase adjusting plate may be further configured to phase-shift the stimulated emission, thereby inducing the relative phase shift between the reference beam and the stimulated emission. In one example the attenuation region includes a stimulation beam block and a central pinhole aperture. In another example the attenuation region includes a gray filter.

In some examples the phase shifting and attenuation apparatus includes a stimulation beam attenuator positioned at the back focal plane of the objective lens and configured to attenuate the stimulation beam to produce an attenuated stimulation beam, and a phase adjusting plate positioned between the stimulation beam attenuator and the detector. In one example the phase adjusting plate is further configured to phase-shift the stimulated emission and includes a central aperture that passes the reference beam (e.g., the attenuated stimulation beam). The phase adjusting plate may be rotatable. In one example the stimulation beam attenuator includes a stimulation beam block having a central pinhole aperture. In another example the stimulation beam attenuator includes a gray filter. In one example the phase adjusting and attenuation apparatus is configured to phase-shift the stimulated emission or the reference beam by 90° or another fixed number of degrees.

In one example the optical apparatus includes an optical relay positioned between the stimulation beam attenuator and the phase adjusting plate. The optical relay may include a pair of lenses, for example. In one example the optical apparatus further includes a lens positioned between the phase adjusting plate and the detector and configured to focus the stimulated emission onto the image plane. In another example the optical apparatus includes at least one lens.

In one example the stimulation source and the objective lens are arranged along a first axis, the stimulation source being configured to direct the stimulation beam along the first axis, and the excitation source is arranged and configured to direct the excitation beam along a second axis orthogonal to the first axis.

According to certain embodiments, a method of fluorescence imaging based on stimulated emission comprises exciting a plurality of fluorescent markers associated with a sample into an excited state, illuminating the sample with a stimulation beam to stimulate the plurality of fluorescent markers in the excited state to produce a stimulated emission, attenuating the stimulation beam transmitted through the sample to produce an attenuated stimulation beam, inducing a relative phase shift between the attenuated stimulation beam (or another reference beam) and the stimulated emission to provide constructive interference between the attenuated stimulation beam (or other reference beam) and the stimulated emission, focusing the stimulated emission onto an image plane, and detecting the stimulated emission with an imaging detector located at the image plane.

In one example exciting the plurality of fluorescent markers includes illuminating the sample with an excitation beam having a wavelength within an absorption band of the plurality of fluorescent markers. The method may further comprise collecting and focusing the stimulated emission and the stimulation beam transmitted through the sample with an objective lens. In some examples the method further comprises intercepting the stimulation beam from the objective lens with a stimulation beam attenuator located at the back focal plane of the objective lens. In one example inducing the relative phase shift between the attenuated stimulation beam (or reference beam) and the stimulated emission includes transmitting the stimulated emission through a phase adjusting plate configured to phase-shift the stimulated emission.

In some embodiments a method of tracking particle movement comprises imaging a stimulated emission produced from fluorescent markers associated with the particles of interest using an example of the method of method of fluorescence microscopy based on stimulated emission, and analyzing the image to track the movement of the particles. In one example, the method can be used to track movement of proteins associated with the fluorescent markers. In another example, the method can be used to track electrical dynamics in a sample or object/subject under test via voltage-sensitive fluorophores. In another example, the method can be used to perform imaging-mode flow cytometry.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
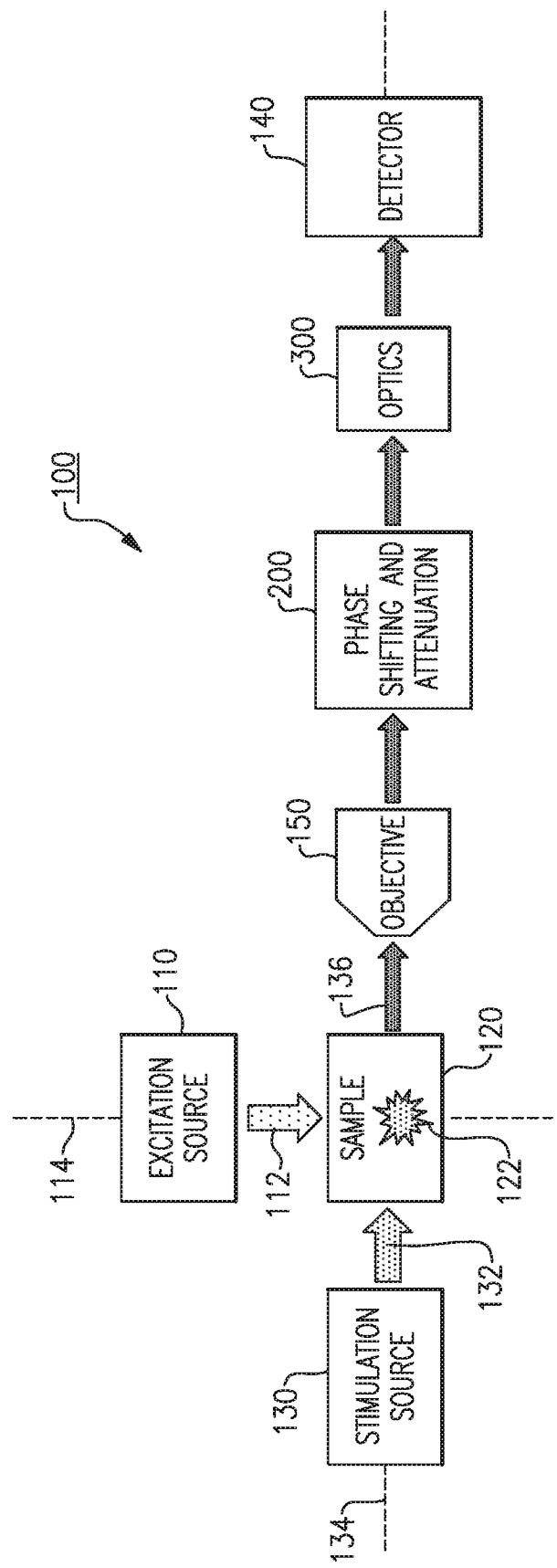
FIG. 1 is a simplified block diagram of one example of a fluorescence microscopy system.

Aspects and embodiments are directed to fluorescence microscopy systems and methods for stimulated emission imaging, and applications thereof. In particular, embodiments apply principles of phase contrast microscopy in the context of stimulated emission imaging to distinguish the stimulated emission from the background stimulation light and thereby increase the signal strength of the fluorescent markers.

As discussed above, the brightness of spontaneously emitted light from a fluorescent marker is weak, being limited by the nanosecond-scale lifetime of the fluorophore in the excited state. In other words, it takes nanoseconds for an excited fluorophore to spontaneously release a single packet of fluorescent light (a photon), and only after that photon is released is it be possible for the fluorophore to get excited and emit again. An excited fluorescent marker can be "stimulated" to emit photons by illuminating the excited marker with a stimulation beam of the appropriate wavelength. Stimulated emission hastens the radiative decay of the excited state and therefore can amplify the emission of light from the fluorophore. Stimulated emission offers many advantages over spontaneous emission, including significantly improved fluorescent marker brightness for imaging due to the rate of stimulated emission being much faster than spontaneous emission. However, as discussed above, it is difficult to distinguish the stimulated emission light from the stimulation beam because they have the same wavelength, same phase, same polarization, and in bulk materials, propagate in the same direction. Conventional noise mitigation techniques, such as wavelength-based filtering, are therefore ineffective. Aspects and embodiments provide techniques by which the stimulated emission light can be distinguished from the background stimulation beam, thereby harnessing the increased fluorescent marker brightness to achieve higher performance imaging. In particular, as discussed in detail below, by leveraging the principles of phase contrast microscopy, a stimulated emission imaging system can be implemented in which the stimulated emission light coherently interferes with a reference beam (which in certain examples can be the stimulation beam) to enhance the signal.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of terms such as "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, above and below, and vertical and horizontal are intended for convenience of description, not to limit the present systems and methods or their components to any one positional or spatial orientation.

Referring to FIG. 1 there is illustrated one example of a fluorescent microscopy system 100 that employs a technique for distinguishing stimulated emission in order to enhance the signal strength of fluorescent markers. The system 100 includes an excitation source 110 that is configured to produce an excitation beam 112 that is used to illuminate a sample 120 and excite fluorescent molecules 122 (e.g. fluorescent markers) associated with the sample 120. For example, the excitation source 110 may be a laser that emits a single light beam having a specified wavelength. The wavelength of the excitation beam 112 may be selected based on the type of fluorescent molecule 122 associated with the sample 120. Fluorescent molecules have an excitation band that spans a certain spectral range (i.e., range of wavelengths of light). Light having a wavelength within the excitation band of a given fluorescent molecule will excite the fluorescent molecule. Accordingly, the excitation source 110 can be configured to produce the excitation beam 112 having a wavelength within the excitation band of the fluorescent molecules 122 associated with a given sample 120. In one example the excitation beam 112 may have a wavelength of about 488 nm. The system 100 further includes a stimulation source 130 configured to produce a stimulation beam 132 that is used to further illuminate the sample 120. In certain examples the stimulation source 130 is a laser. The fluorescent molecules 122 further have an emission spectrum that defines the spectral range over which the fluorescent molecules emit when they relax from the excited state to the ground state. The emission spectrum is typically different from the excitation band, but may partially overlap the excitation band. The stimulation beam 132, which comprises collimated light, is used to stimulate excited fluorescent molecules 122 to emit, and therefore the stimulation source 130 may be configured to produce the stimulation beam 132 having a wavelength within the emission spectrum of the fluorescent molecules 122. In certain examples the wavelength of the stimulation beam 132 may be selected to be different from the wavelength of the excitation beam 112, and preferably spectrally spaced relatively far apart from the wavelength of the excitation beam 112. Such a configuration allows the excitation beam 112 to be easily spectrally filtered out from light to be imaged. In one example the wavelength of the stimulation beam 132 is about 550 nm. Thus, in one example, the wavelength of the excitation beam may be about 488 nm and the wavelength of the stimulation beam may be about 550 nm; however, numerous other examples of excitation and stimulation wavelengths may be used.

The excitation beam 112 propagates along a first axis 114 from the excitation source 110 to the sample 120, and the stimulation beam 132 propagates along a second axis 134 from the stimulation source 130 to the sample 120. In the example shown in FIG. 1, the first axis 114 is orthogonal or perpendicular to (i.e., at roughly 90 degrees relative to) the second axis 134. This arrangement may be advantageous in that the excitation beam 112 does not propagate in the direction of a detector 140 used to image emissions from the sample 120, and therefore "noise" at the detector 140 from the excitation beam 112 may be reduced. However, it is not necessary for the first and second axes 114, 134 to be orthogonal, and the first axis 114 may be co-linear with the second axis 134 or arranged at any angle relative to the second axis 134.

As noted above, once the fluorescent molecules 122 assume an excited state after illumination by the excitation beam 112, illumination by the stimulation beam 132 causes the excited fluorescent molecules to emit photons (stimulated emission) and relax to the ground state where they can be excited again by the excitation beam 112. Accordingly, in certain examples the excitation source 110 and/or the stimulation source 130 can be configured to produce the excitation beam 112 and/or the stimulation beam 132, respectively, as pulsed beams that follow one another in time. For example, the excitation source 110 may emit a pulse of the excitation beam 112 that excites the fluorescent molecules 122, after which the stimulation source 130 may emit a pulse of the stimulation beam 132 to stimulate the excited fluorescent molecules to emit the stimulated emission that can be detected by the detector 140, as discussed further below. In some examples the stimulation beam 132 may be focused onto the sample 120 using an optics arrangement (not shown) to illuminate the excited fluorescent molecules 122 immediately after initial excitation occurs in the sample 120 by application of the excitation light beam 112. In some examples the excitation beam 112 may be a continuous beam and the stimulation beam 132 may be pulsed. In other examples both the excitation beam 112 and the stimulation beam 132 may be continuous; however, this arrangement may be more power-intensive than a pulsed beam arrangement.

As discussed above, the stimulated emission from fluorescent markers can be difficult to distinguish from the stimulation beam 134 because it has the same wavelength, phase, and polarization, and propagates in the same direction from the sample 120 along the axis 134 shown in FIG. 1. Thus, the light 136 from the sample includes both the stimulation beam 132 and the stimulated emission from the fluorescent molecules 122. Because the stimulated emission is generally weak in comparison to the stimulation beam 132, in conventional systems it either cannot be imaged at all or produces a poor-quality image with very low contrast or signal-to-noise ratio. Accordingly, to distinguish and separate the stimulation beam 132 from the stimulated emission, the fluorescence microscopy system 100 is configured to attenuate the stimulation beam 132 and leverage techniques from phase contrast microscopy in which the phase of a reference beam (which in certain examples can be the attenuated stimulation beam) and the phase of the stimulated emission are manipulated differently to create contrast and enhance the signal for imaging by the detector 140.

Figure 2:
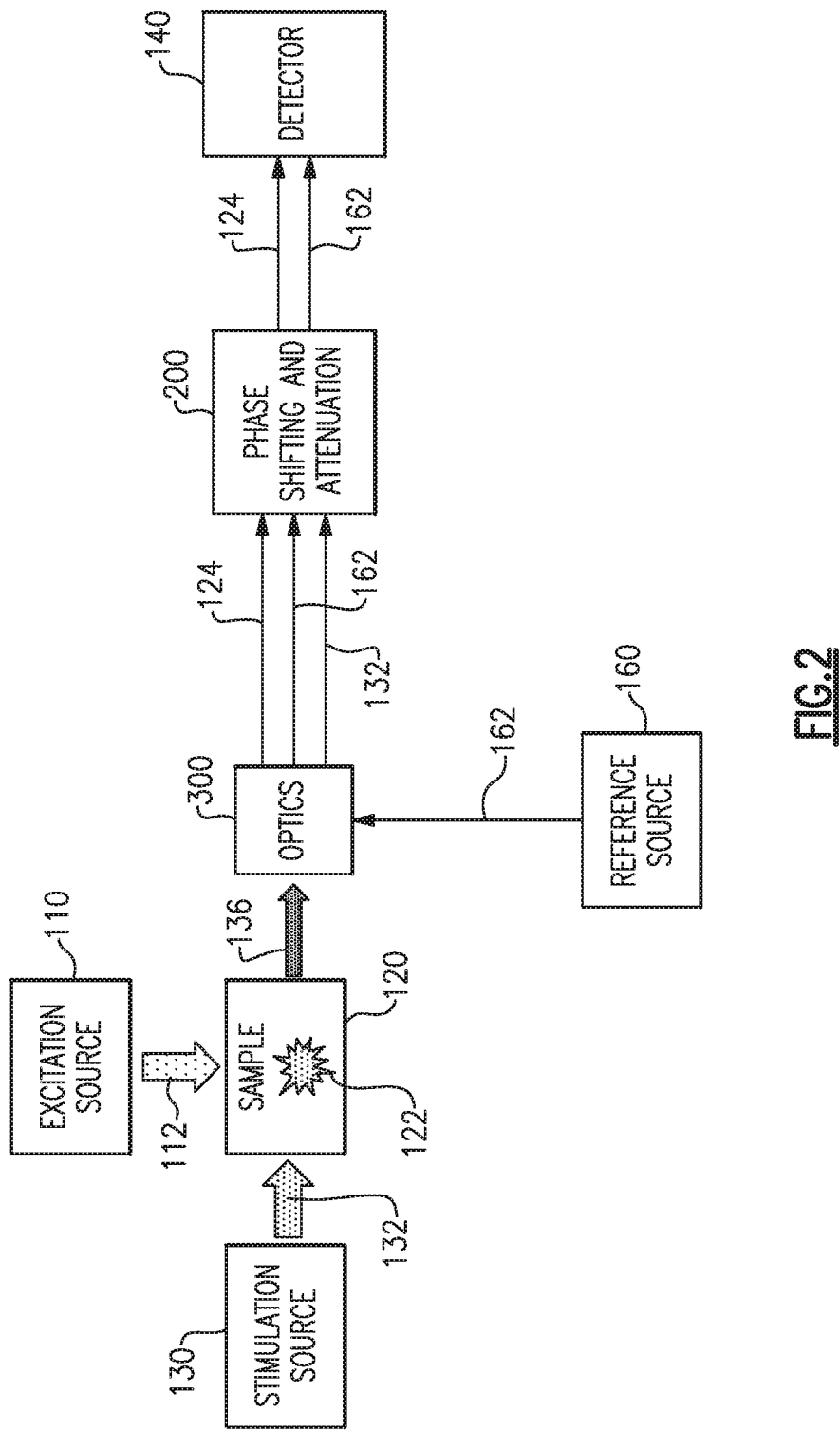
FIG. 2 is a block diagram of one example of the fluorescence microscopy system of FIG. 1.
Figure 3:
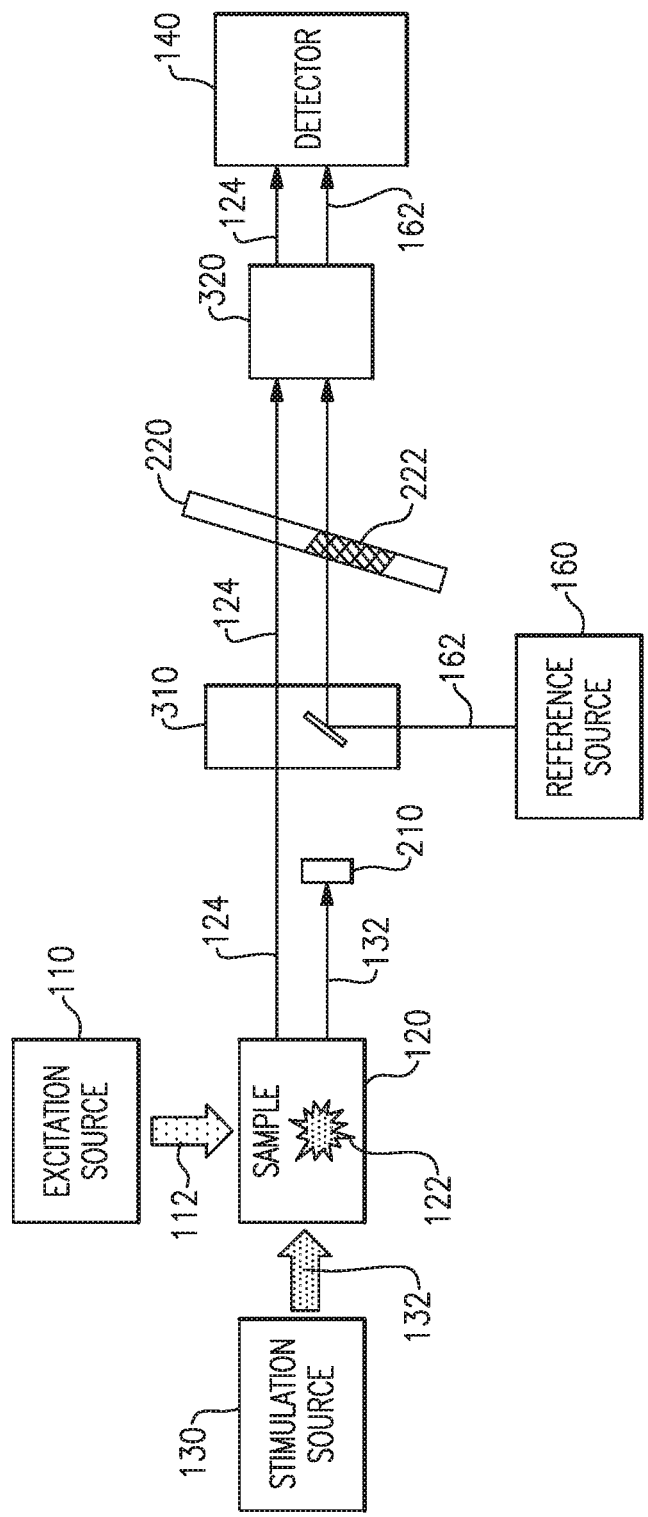
FIG. 3 is a block diagram of an example of the fluorescence microscopy system of FIG. 2.
Figure 4:
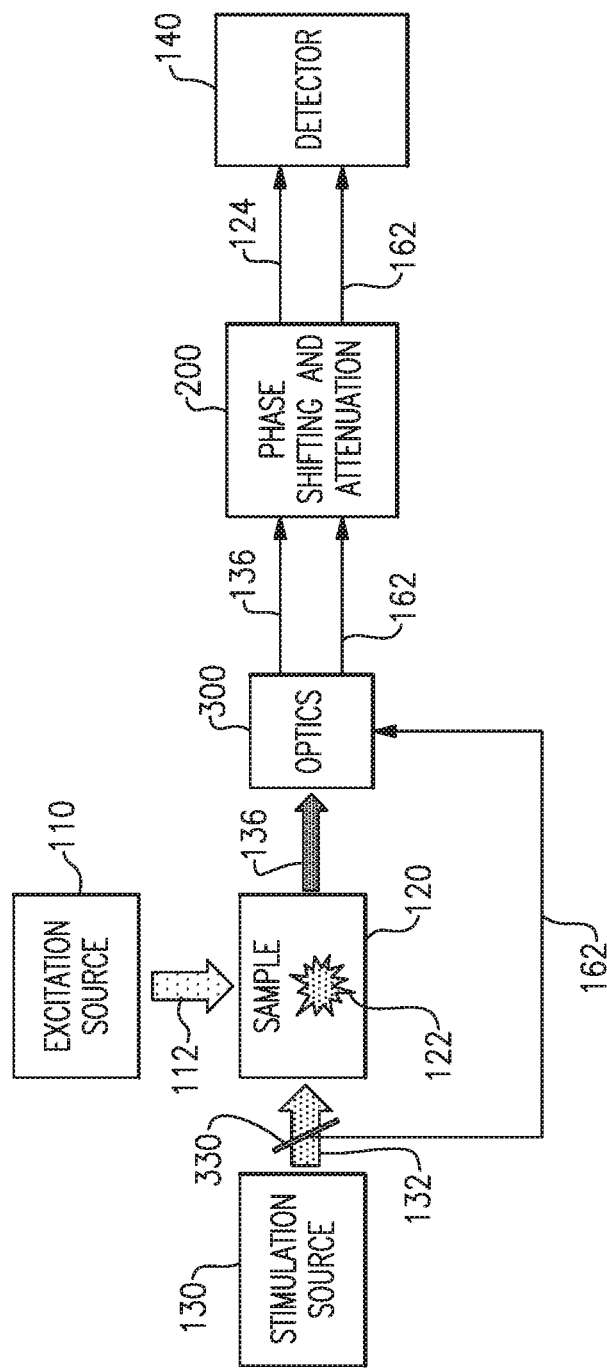
FIG. 4 is a block diagram of another example of the fluorescence microscopy system of FIG. 1.
Figure 5A:
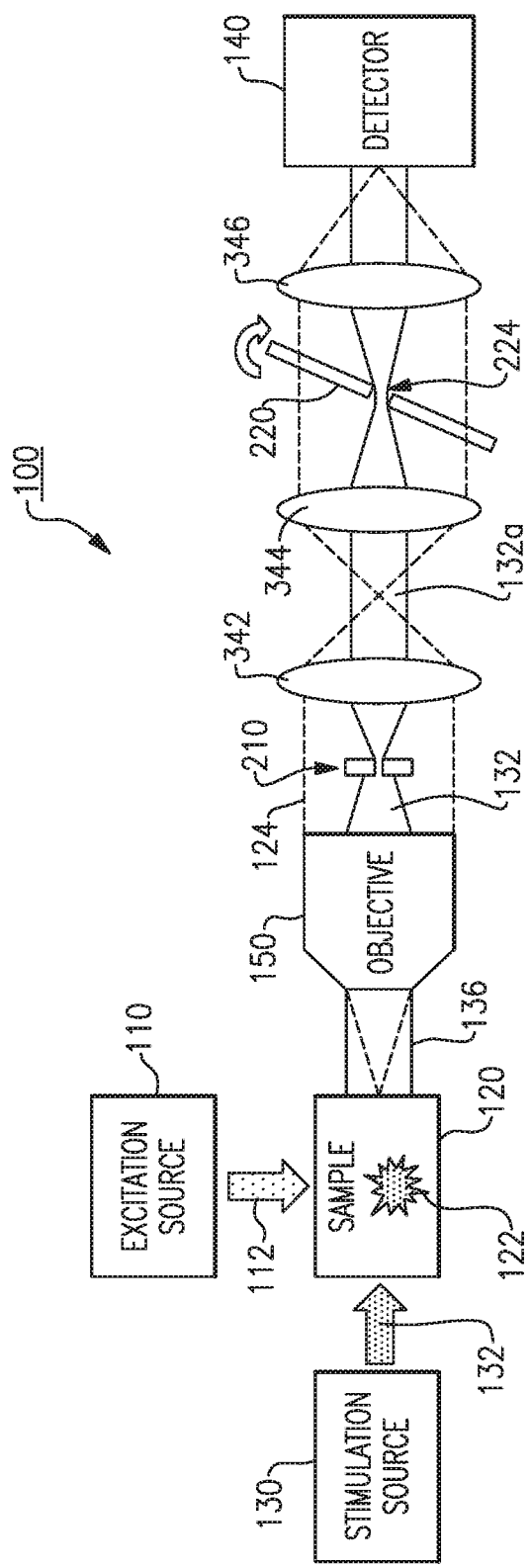
FIG. 5A is a block diagram of another example of the fluorescence microscopy system of FIG. 1.
Figure 5B:
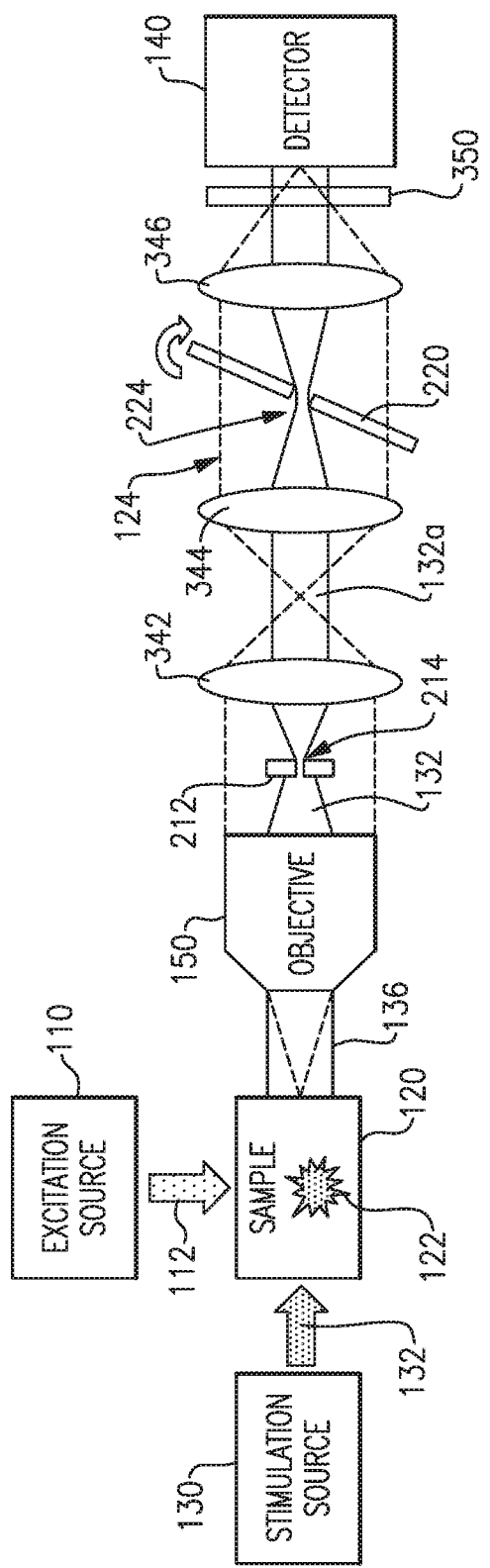
FIG. 5B is block diagram of another example of the fluorescence microscopy system of FIG. 5A.

Still referring to FIG. 1, the system 100 includes an objective 150 that focuses the light 136 toward the detector 140. The objective 150 may typically be an objective lens, but may be implemented using reflective optics (e.g., mirrors). The system 100 further includes a phase shifting and attenuation apparatus 200 that receives the light 136. The phase shifting and attenuation apparatus 200 acts to enhance the stimulated emission signal for imaging by generating constructive interference between the stimulated emission and a reference beam in regions of the field of view of the detector 140 that contain the stimulated emission, and by attenuating the stimulation beam 132, thereby reducing the amount of "background light" that reaches the image plane. Various examples of the phase shifting and attenuation apparatus 200 are discussed below with reference to FIGS. 2-6. Optics 300 are configured to focus the stimulated emission onto the detector 140. Examples of the optics 300 are also discussed below with reference to FIGS. 2-6. In the block diagram shown in FIG. 1, the optics 300 are shown positioned between the phase shifting and attenuation apparatus 200 and the detector 140; however, in practical implementation, the elements making up these components may be intermingled with one another (as shown in FIGS. 3, 5A, and 5B, for example), or the phase shifting and attenuation apparatus 200 may be positioned between the optics 300 and the detector 140. Accordingly, FIG. 1 is simply intended to shown the functional components of an example of the system 100 rather than a particular physical arrangement.

In the example shown in FIG. 1, the detector 140 is shown positioned on the second axis 134 along which the stimulation beam 132 is directed to the sample, such that the light 136 travels along the second axis 134 from the sample 120 to the detector 140. However, in other examples, the detector 140 need not be positioned on the second axis 134. For example, the optics 300 may include one or more fold mirrors (not shown) that redirect the light 136 along an optical path that is arranged at an angle with respect to the second axis 134. Further, as discussed above, in certain examples the excitation source may be arranged such that the excitation beam may also travel along the second axis 134 toward the detector. In this case, the optics 300 may include a spectral filter configured to filter out the excitation beam 132 before it reaches the detector 140.

As discussed above, the phase shifting and attenuation apparatus 200 acts to both attenuate the stimulation beam 132 and to impart a relative phase shift between the stimulated emission from the sample and a reference beam so as to enhance imaging of the stimulated emission at the detector 140. Referring to FIG. 2 there is illustrated a block diagram of one example of the fluorescence microscopy system 100 of FIG. 1. In this example, the system 100 includes a reference source 160 that produces the reference beam 162. The optics 300 may be configured to couple the reference beam 162 into the optical path of the phase shifting and attenuation apparatus 200 and the detector 140. The stimulated emission 124, the stimulation beam 132, and the reference beam 162 are directed to the phase shifting and attenuation apparatus 200, which attenuates the stimulation beam 132 and induces a relative phase shift between the stimulated emission 124 and the reference beam 162. This relative phase shift causes the reference beam 162 and the stimulated emission 124 from the sample 120 to constructively interfere, resulting in an increase in the image contrast in regions of the detector field of view that correspond to the sample 120 compared to regions that do not contain the sample. In this manner, imaging of the stimulated emission 124 can be enhanced.

FIG. 3 is a block diagram of one example of the fluorescence microscopy system 100 of FIG. 2, showing an example of an arrangement of the phase shifting and attenuation apparatus 200 and the optics 300. In this example, the optics 300 includes a beam combining component 310 that is configured to couple the reference beam 162 into the optical path. The optics 300 further includes an additional optical arrangement 320, which may include one or more lenses, one or more mirrors, or a combination thereof, configured to direct and focus the stimulated emission 124 and the reference beam 162 onto the detector 140. The beam combining component may include a beam splitter and/or one or more mirrors and/or lenses configured to inject the reference beam 162 into the optical path of the stimulated emission 124. In the illustrated example, the phase shifting and attenuation apparatus 200 includes a stimulation beam attenuator 210 and a phase adjusting plate 220. The stimulation beam attenuator 210 is configured and arranged to significantly attenuate the stimulation beam 132 without significantly attenuating the stimulated emission 124. For example, the stimulation beam attenuator 210 may include a beam blocking component (e.g., an element that is optically opaque at the wavelength of the stimulation beam 132) that is positioned such that the stimulation beam 132 is focused onto and blocked by the stimulation beam attenuator 210, while the stimulated emission 124 is imaged around the stimulation beam attenuator 210.

The phase adjusting plate 220 acts to phase-shift either the stimulated emission 124 or the reference beam 162. In the example illustrated in FIG. 3, the phase adjusting plate 220 is shown has having a region 222 through which the reference beam 162 passes. This region 222 can have a different thickness or different optical properties compared to the remainder of the phase adjusting plate 220, such that the stimulated emission 124 is phase-shifted relative to the reference beam 162, or vice versa. In one example the phase adjusting plate 220 can be configured to impart complementary phase-shifts (e.g., offset from one another by a selected number of degrees) to the stimulated emission 124 and the reference beam 162. It is the relative phase between the reference beam 162 and the stimulated emission 124 that allows for the desired constructive interference to occur, rather than the absolute phase of either light beam. The phase adjusting plate 220 may be configured with a certain thickness or other optical properties (e.g., refractive index) calibrated to provide a certain phase shift (e.g., −90°, +90°, or some other number of degrees) at the wavelength of the stimulated emission 124. In certain examples the phase adjusting plate 220 may be rotatable or otherwise adjustable to provide a desired phase shift for different frequencies of light.

The reference source 160 is a light source configured to provide the reference beam 162. In certain examples the reference source 160 can be a laser. In the examples shown in FIGS. 2 and 3, the reference source 160 is shown as a separate component from the stimulation source 130. However, in other examples the stimulation source 130 can also be the reference source 160. For example, a portion of the stimulation beam 132, or the attenuated stimulation beam produced by the phase shifting and attenuation apparatus 200, can be used as the reference beam 162, thus removing the need for a dedicated reference source 160. FIG. 4 shows an example of the fluorescence microscopy system 100 in which an optical component 330 is used to extract a portion of the stimulation beam 132 to provide the reference beam 162. The optical component 330 can be a beamsplitter, fold mirror, or other component configured to redirect a portion of the stimulation beam 132 to be used as the reference beam 162. The optics 300 can be configured to couple the reference beam 162 into the optical path, such that the phase shifting and attenuation apparatus 200 can act to cause a relative phase shift between the reference beam 162 and the stimulated emission 124, as discussed above.

Referring to FIG. 5A there is illustrated another example of the fluorescence microscopy system 100 of FIG. 1 in which the attenuated stimulation beam is used as the reference beam 162, and showing further examples of arrangements of the phase shifting and attenuation apparatus 200 and the optics 300. As discussed above, the light 136 may include the stimulated emission 124 and the stimulation beam 132, as shown. Similar to the example of FIG. 3, in the example of FIG. 5A, the phase shifting and attenuation apparatus 200 includes a stimulation beam attenuator 210 and a phase adjusting plate 220. The optics 300 in this example includes a first lens 342, a second lens 344, and a third lens 346. The first lens 342 and the second lens 344 act as an optical relay, and the third lens 346 focuses the stimulated emission 124 onto an image plane at the detector 140. Those skilled in the art will appreciate, given the benefit of this disclosure, that the first, second, and third lenses 342, 344, 346 may each include a single lens element or multiple lens elements, and further that any of the first, second, or third lenses may be replaced or supplemented with one or more reflective optical elements, such as mirrors. Accordingly, the illustration of three lenses 342, 344, 346 is intended to be representative of the function performed by the optics 300 and not to limit physical implementation of the optics 300 to the configuration shown. As discussed above, in certain examples the system 100 may include a spectral emission filter 350 positioned between the lens 346 and the detector 140, as shown in FIG. 5B.

According to one example, the stimulation beam attenuator 210 is configured and arranged to significantly attenuate the stimulation beam 132 without significantly attenuating the stimulated emission 124. In the example illustrated in FIGS. 5A and 5B, the stimulation beam attenuator 210 includes a beam blocking component 212 having a small central aperture 214, also referred to as a "pinhole". The beam blocking component 212 may be positioned at the back focal plane of the objective 150, such that the stimulation beam 132 is focused onto the stimulation beam blocking component and substantially blocked from detection by the detector 140, while allowing the stimulated emission 124 to be imaged around the stimulation light blocking component and focused by the optics 300 onto the detector 140. In certain examples, a relatively small amount of the stimulation beam 132 passes through the central aperture 214 of the stimulation beam blocking component 212, such that an attenuated stimulation beam 132a continues along the second axis 134 toward the detector 140, as shown. This arrangement maximizes the amount of the stimulated emission 124, while minimizing the amount of the stimulation beam (i.e., background light), that reaches the image plane at the detector 140.

Still referring to FIGS. 5A and 5B, in one example, the attenuated stimulation beam 132a and the stimulated emission 124 are passed via the optical relay formed by the first and second lenses 342, 344, to the phase adjusting plate 220. The phase adjusting plate 220 acts to phase-shift the stimulated emission 124, the attenuated stimulation beam 132a, or both. As discussed above this phase shift causes the attenuated stimulation beam 132a and the stimulated emission 124 from the sample 120 to constructively interfere, resulting in an increase in the image contrast in regions of the detector field of view that correspond to the sample 120 compared to regions that do not contain the sample. In the illustrated example, the phase adjusting plate 220 is shown has having a small central aperture 224 through which the attenuated stimulation beam 132a passes. Thus, in this example, the phase adjusting plate acts to phase-shift the stimulated emission 124 rather than the attenuated stimulation beam 132a. However, those skilled in the art will readily appreciate, given the benefit of this disclosure, that the phase adjusting plate 220 may instead be configured to phase-shift the attenuated stimulation beam 132a rather than the stimulated emission 124. Alternatively, the phase adjusting plate 220 can be configured to impart complementary phase-shifts (e.g., offset from one another by a selected number of degrees) to the stimulated emission 124 and the attenuated stimulation beam 132a. As discussed above, it is the relative phase between the attenuated stimulation beam 132a and the stimulated emission 124 that allows for the desired constructive interference to occur, rather than the absolute phase of either light beam. The phase adjusting plate 220 may be configured with a certain thickness calibrated to provide a certain phase shift (e.g., −90°, +90°, or some other number of degrees) at the wavelength of the stimulated emission 124. In certain examples the phase adjusting plate 220 may be rotatable or otherwise adjustable to provide a desired phase shift for different frequencies of light.

In the example of FIGS. 5A and 5B, the phase adjusting plate 220 is positioned further along the optical train (i.e., closer to the detector 140) than the stimulation beam attenuator 210. However, embodiments of the fluorescence microscopy system 100 are not limited to this arrangement. In other examples the stimulation beam attenuator 210 can be positioned in the optical train following (or "downstream" of) the phase adjusting plate 220. In this case, the phase adjusting plate 220 may act to phase-shift either the stimulation beam 132 or the stimulated emission 124, and the stimulation beam attenuator 210 acts to attenuate the (optionally phase-shifted) stimulation beam 132 before it reaches the detector 140. Further, in the examples of FIGS. 3, 5A, and 5B, the stimulation beam attenuator 210 and the phase adjusting plate 220 are shown as separate components. In other embodiments, however, these two components can be combined into one composite component. For example, FIG. 6 illustrates an embodiment in which the system 100 includes a combined phase adjusting and attenuation component 230.

Figure 6:
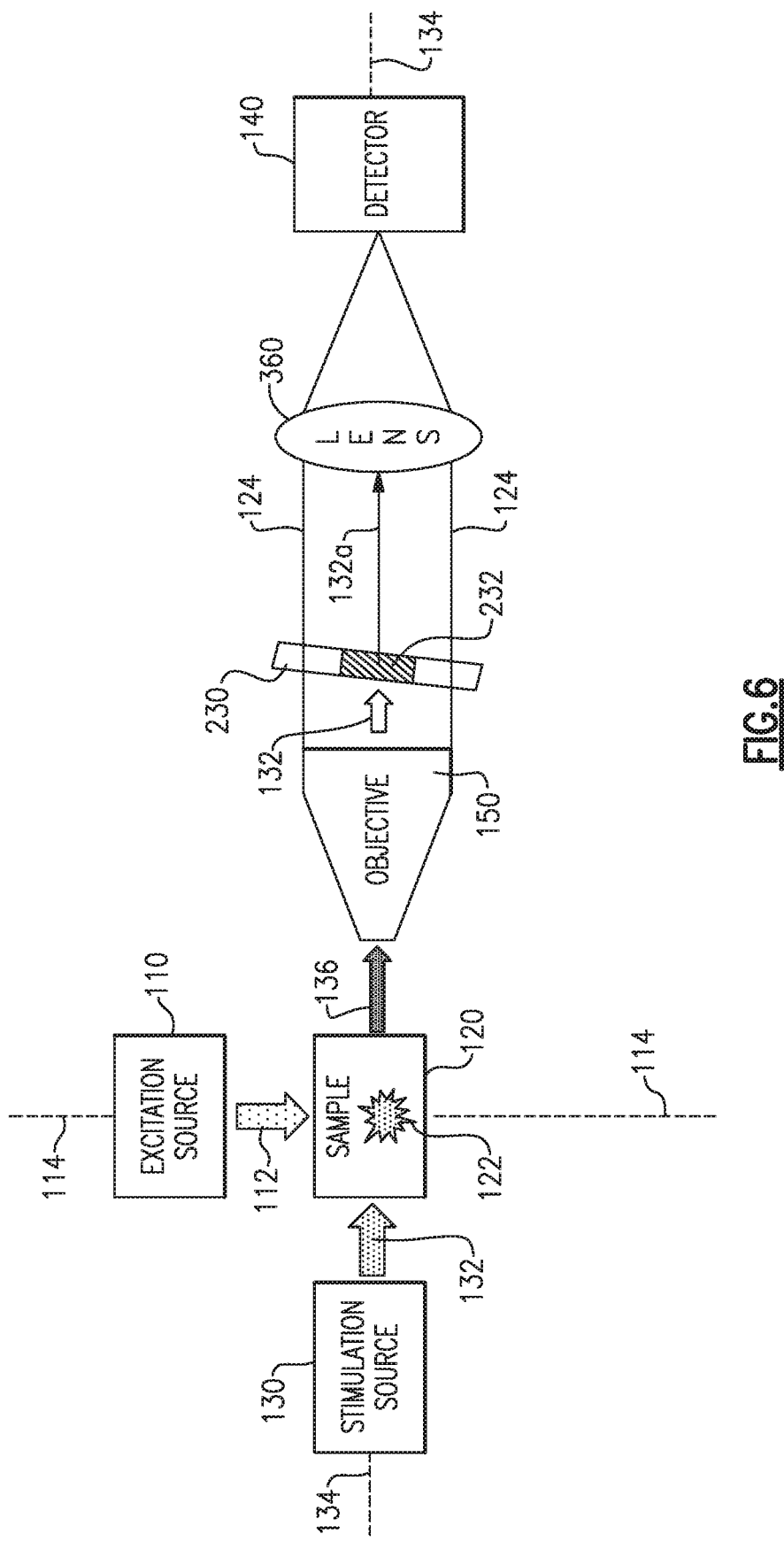
FIG. 6 is a block diagram of another example of the fluorescence microscopy system of FIG. 1.

Referring to FIG. 6, in this example the system 100 includes a combined phase adjusting and attenuation component 230 positioned to receive the light 136 from the objective 150. As discussed above, the light 136 includes both the stimulated emission 124 to be imaged and the stimulation beam 132. The combined phase adjusting and attenuation component 230 can be configured to attenuate the stimulation beam 132 while also producing a relative phase shift between the stimulated emission 124 and the attenuated stimulation beam 132a. As discussed above, this can be achieved by phase-shifting either or both the stimulation beam 132 and the stimulated emission 124 such that the phase shift between the two is either increased or decreased by a certain amount. In the example shown in FIG. 6, the combined phase adjusting and attenuation component 230 includes an attenuation region 232 positioned at or near the back focal plane of objective 150 so as to attenuate the stimulation beam 132 while allowing the stimulated emission 124 to pass through (or around) the remaining portions of the component 230, thereby avoiding or minimizing any attenuation of the stimulated emission. In one example the attenuation region 232 may be similar to the stimulation beam attenuator 210 shown in FIGS. 5A and 5B. In other words, it may include a beam block (i.e., a substantially completely opaque region) with a small pinhole aperture, such that the majority of the stimulation beam 132 is blocked while a small amount is allowed the pass through the aperture. In this case, where the aperture is a physical hole, the combined phase shifting and attenuation component 230 may be configured to phase-shift the stimulated emission 124. In other examples the attenuation region 232 may be attenuating filter, such as a co-called "gray filter", that substantially attenuates the stimulation beam 132.

Although the combined phase adjusting and attenuation component 230 is shown in FIG. 6 in an example of the system 100 in which the reference beam 162 is the attenuated stimulation beam 132a, given the benefit of this disclosure, those skilled in the art will appreciate that the combined phase adjusting and attenuation component 230 can similarly be used in examples of the system 100 in which another reference beam 162 is used. In such examples, the combined phase adjusting and attenuation component 230 may include both a region that attenuates the stimulation beam 132 and one or more regions that phase-shift the stimulated emission 124 and/or the reference beam 162.

In certain examples, the size of the central aperture in the stimulation beam attenuator 210, or the "darkness" of the gray filter, and therefore the level of attenuation of the stimulation beam 132, can be selected based on the brightness of the stimulated emission 124. In some instances, this can be pre-selected based on a known or estimated expected brightness of the stimulated emission. In other examples, the level of attenuation of the stimulation beam 132 can be dynamically adjusted responsive to information about the brightness of the stimulated emission obtained during the imaging process. In certain examples where a portion of the stimulation beam 132 is used as the reference beam 162 it is necessary for at least some of the stimulation beam 132 to be available to constructively interfere with the stimulated emission 124, as discussed above; however, in general some level of attenuation of the stimulation beam 132 is desirable so as to prevent the detector 140 from being saturated with the stimulation beam and unable to detect the stimulated emission. In some examples, the level of attenuation of the stimulation beam can be dynamically controlled by adjusting the size of the central aperture of the stimulation beam attenuator 210. In other examples, the level of attenuation of the stimulation beam can be dynamically controlled by using an adjustable gray filter, such as a liquid crystal based filter, or a mechanically movable set of filters (e.g., such that progressively "darker" or "lighter" filters can be moved into and out of the optical path based on a desired level of attenuation of the stimulation beam 132). Those skilled in the art will appreciate that various mechanisms of providing adjustable attenuation are known and may be used in embodiments of the system 100.

In the example shown in FIG. 6, the optics 300 of FIG. 1 are represented by a lens 360 that focuses the stimulated emission 124 onto an image plane at which the detector 140 is located. However, in other examples the combined phase adjusting and attenuation component 230 can be used with relay optics, such as the lenses 342 and 344 shown in FIGS. 5A and 5B. In certain examples the back focal plane of the objective lens 150 may be within the objective lens itself. In this case, a configuration of the optics 300 that includes an optical relay, such as that shown in FIGS. 5A and 5B, may be preferable. Regardless of the specific design of the optics 300, once the stimulated emission 124 is captured by the objective 150, the stimulated emission 124 is focused onto the detector 140 for capturing images of the stimulated emission 124 emitted by the sample 120. The optics 300 can further be designed to provide the system 100 with a certain desired level of optical magnification. Those skilled in the art will appreciate, given the benefit of this disclosure, that numerous configurations of the optics 300 and phase adjusting and attenuation apparatus 200 can be implemented, and embodiments of the system 100 are not limited to the examples shown in the accompanying drawings For example, in certain instances the phase adjusting function can be incorporated within a specially designed objective 150, thereby eliminating the need for a separate phase adjusting plate 220.

Thus, as described above, various embodiments and implementations of the system 100 operate to attenuate the stimulation beam 132 so as to reduce the amount of background light reaching the detector 140, and to produce constructive interference between the remaining portion of the stimulation beam or another reference beam and the stimulated emission by phase-shifting one or both beams so as to enhance the image contrast at the detector. Some of the stimulation emission 124 may be attenuated (dimmed) and by the stimulation beam attenuator 210 or attenuation region 232 of the combined phase adjusting and attenuation component 230, but to a much lesser extent than the stimulation beam 132 (which only illuminates the stimulation beam attenuator or attenuation region by design of the optical train). As a result, the stimulated emission 124 can be distinguished from the background stimulation beam 132, and imaged with sufficient resolution to provide useful imaging capability in a wide range of applications.

Embodiments of the fluorescence microscopy system 100, and the associated ability to distinguish the stimulated emission 124 from the stimulation beam 132 and thereby usefully image the stimulated emission, may have utility in a wide variety of applications, including, for example, providing the ability to track faster protein movement, to improve imaging-mode flow cytometry speed and reliability, to improve gene sequencing speed and reliability, to provide improved scattering microscopy, to provide for imaging voltage-sensitive fluorophores, and to allow imaging of smaller and/or fainter targets compared to conventional fluorescent microscopy.

As discussed above, when fluorescent markers 122 are excited by the excitation beam 112, they will spontaneously emit light as they relax from the excited state to the ground state after some time. A probability density function describes the rate of spontaneous emission, which is generally on the order of approximately 1 ns. An excited fluorescent marker cannot be re-excited until emission has occurred. Accordingly, once the excitation beam 112 is of sufficient intensity to excite substantially all the fluorescent molecules 122 in the sample 120, further increasing the intensity of the excitation beam 112 cannot increase the amount of light produced by spontaneous emission (i.e., the intensity or brightness of the emission) from the fluorescent molecules. This is known as the saturation limit. However, applying the stimulation beam 132 causes the fluorescent molecules 122 to emit more quickly, thereby allowing them to be re-excited by the excitation beam 112 sooner, and therefore to emit again. In other words, the rate of stimulated emission is far faster than that of spontaneous emission, and can be controlled by controlling the intensity of the stimulation beam. For example, the stimulation beam 132 can be configured to have an intensity such that the probability that all the fluorescent molecules will emit within a certain time period approaches certainty. This time period can be set by controlling the intensity of the stimulation beam 132, and can be orders of magnitude shorter than the roughly 1 ns time-frame of spontaneous emission. Accordingly, the amount of emitted light, and therefore the brightness of the emission, from the fluorescent molecules 122 in a given time-span, such as 1 second, for example, is vastly increased. This allows for improved imaging of very small or faint targets, for example.

In addition, because the rate of stimulated emission can be very fast, imaging the stimulated emission using embodiments of the system 100 provides improved capability to view or track events taking place over very short time frames, such as protein movement, for example, and improved speed and precision in associated applications such as flow cytometry, scattering microscopy, or gene sequencing, for example. In another example embodiments of the system 100 can be used for imaging voltage sensitive fluorophores. These fluorophores become active when exposed to electrical potentials, such as in a neuron, for example. Electrical transients travel across neurons for only tiny fractions of a second, and therefore can be very difficult or even impossible to monitor using conventional techniques. Because the rate of stimulated emission can be faster than the rate of spontaneous emission, using stimulated emission may be able to supply more light in a shorter amount of time, allowing for the capture of better resolution time-resolved images of electrical signals via voltage-sensitive fluorescent markers.

Förster resonance energy transfer (FRET) is a distance-dependent mechanism describing energy transfer between two light-sensitive molecules (chromophores). A donor chromophore, initially in its electronic excited state, may transfer energy to an acceptor chromophore through nonradiative dipole-dipole coupling. The absorption spectrum of the acceptor chromophore must overlap the fluorescence emission spectrum of the donor chromophore. When both chromophores are fluorescent molecules, this phenomenon is referred to as fluorescence resonance energy transfer. The efficiency of FRET is inversely proportional to the sixth power of the distance between the donor and the acceptor, making it useful over distances comparable to the dimensions of biological macromolecules (e.g., 10-100 Å). Thus, FRET can be used to determine if two fluorescent markers are within a certain distance of each other, which may be useful to track protein movement, for example. However, conventional methods of measuring FRET efficiency are slow. For example, conventionally measuring the emission from the acceptor is limited by the rate of spontaneous emission of the acceptor. FRET efficiencies can also be inferred from the photobleaching rates of the donor in the presence and absence of an acceptor, but the timescale is that of photobleaching, which is seconds to minutes. As discussed above, embodiments of the system 100 disclosed herein provide the ability to distinguish stimulated emission from fluorescent marker, or other chromophore, and thereby allow for imaging of the stimulated emission. Accordingly, with this ability stimulated emission can be applied with FRET, using a stimulation beam having a wavelength within the emission band of the acceptor to stimulate emission by the acceptor. As discussed above, the rate of stimulated emission can be orders of magnitude faster than that of spontaneous emission, and therefore the ability to image the stimulated emission allows the FRET measurement rate to be vastly increased, thereby enabling more precise protein movement tracking and providing the ability to track faster protein movement.

Photobleaching is a phenomenon that results in the permanent inactivation of excited fluorophores. Photobleaching increases markedly with more intense incident light, namely, when the excitation beam has higher intensity. Although photobleaching can have some uses, such as being used to infer FRET efficiencies, as discussed above, it is generally an undesirable phenomenon because it limits the useful life of fluorescent markers in a sample. It has been hypothesized that photobleaching occurs as a result of collisions between an excited fluorophore and another molecule in the sample. Thus, the longer the fluorophore is in the excited state, the higher its chance of a damaging collision. In conventional fluorescent microscopy, photobleaching is an unavoidable risk as it is generally advantageous to have a relatively high-intensity excitation beam in order to excite as many fluorescent markers in the sample as possible, and the rate of spontaneous emission is a natural constant. However, embodiments of the system 100 provide the ability to perform stimulated emission based imaging (not possible with conventional fluorescent microscopy systems), and as discussed above, by controlling the intensity of the stimulation beam, the rate of the stimulated emission can be controlled and be much faster than that of spontaneous emission. As a result, the excited fluorophores can be stimulated to emit, and relax to the ground state, in a very short time frame (e.g., picoseconds rather the nanosecond timescale of spontaneous emission) such that the time a fluorophore spends in the excited state is greatly reduced, which may in turn greatly reduce the risk of that fluorophore having a damaging collision while in the excited state. As a result, the ability provided by embodiments of the system 100 to image the stimulated emission may have the added benefit of reducing photobleaching and extending the useful life of fluorescent molecules in a sample.

According to another embodiment, another application of stimulated emission imaging enabled by the phase contrast techniques disclosed herein is the ability to record images of fluorescent molecules on high-speed, high read-noise cameras. Because spontaneous fluorescent signals are weak, fluorescence images are conventionally captured using low read-noise cameras that acquire images slowly, but function well in very dark environments. In addition to being brighter than fluorescence, stimulated emission is coherent, and can be detected through interference with bright background light. As a result, cameras with high read-noise may be used instead. These types of cameras can operate orders of magnitude faster than low read-noise cameras. Thus, using stimulated emission imaging according to embodiments disclosed herein can enable applications that may require high speed imaging, such as imaging-mode flow cytometry, for example. Flow cytometry suffers from small fluorescent signals because of the small time window available to interrogate a fluorescent sample as it travels past the detector. As a result, the fluorescence in flow cytometry conventionally must be imaged by a high sensitivity single-pixel light detector. In contrast, imaging stimulated emission from fluorophores according to embodiments disclosed herein may allow those single-pixel detectors to be replaced with high frame-rate cameras and provide the ability to capture two-dimensional images of samples.

Thus, aspects and embodiments provide systems and methods that employ a technique for distinguishing stimulated emissions as a mechanism for enhancing signal strength of fluorescent markers in a sample, thereby enabling improved imaging capability and the use of fluorescence microscopy in expanded applications. Embodiments of the stimulated emission based fluorescent microscopy system disclosed herein may be implemented and used as a stand-alone imaging system, or may be integrated into the equipment and/or process flow associated with applications such as flow cytometry, gene sequencing, and the like.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

The invention claimed is:

1. A fluorescence imaging system comprising:
an excitation source configured to generate an excitation beam along a first axis;
a stimulation source configured to generate a stimulation beam along a second axis, the excitation beam and the stimulation beam having different wavelengths;
a sample having a plurality of fluorescent markers which are illuminated by the excitation light beam such that the plurality of fluorescent markers assumes an excited state and then illuminated again by the stimulation light beam to generate a stimulated emission by the initially excited sample;
an objective lens oriented along the second axis and configured to capture and focus the stimulation beam and the stimulated emission emitted by the plurality of fluorescent markers;
a stimulation beam attenuator positioned at the back focal plane of the objective lens and configured to attenuate the stimulation beam while allowing the stimulated emission to pass;
a phase adjusting component configured to induce a relative phase-shift between the stimulated emission and a reference beam to produce constructive interference between the reference beam and the stimulated emission; and
a detector configured to image the stimulated emission.

2. The fluorescence imaging system of claim 1 wherein the reference beam is the attenuated stimulation beam.

3. The fluorescence imaging system of claim 2 wherein the stimulation beam attenuator includes a beam block having a central pinhole aperture, the beam block being optically opaque to the stimulation beam, and the stimulation beam attenuator being positioned such that a portion of the stimulation beam passes through the central pinhole aperture to provide the attenuated stimulation beam.

4. The fluorescence imaging system of claim 2 wherein the stimulation beam attenuator includes a gray filter.

5. The fluorescence imaging system of claim 1 wherein the excitation beam along the first axis is not captured by the objective lens.

6. The fluorescence imaging system of claim 1 wherein the stimulation beam is collimated.

7. The fluorescence imaging system of claim 6 wherein the at least one lens includes a first lens, a second lens, and a third lens, the first and second lenses being configured as an optical relay, and the third lens positioned and configured to receive the stimulated emission from the optical relay and to focus the stimulated emission onto the detector.

8. The fluorescence imaging system of claim 1 further comprising:
at least one lens positioned between the objective lens and the detector and configured to focus the stimulated emission onto the detector.

9. The fluorescence imaging system of claim 1 wherein the stimulation source and the excitation source each includes a laser.

10. The fluorescence imaging system of claim 1 wherein the phase shifting component is configured to impart a fixed phase shift of a predetermined number of degrees to one of the stimulated emission and the reference beam.

11. The fluorescence imaging system of claim 1 wherein the phase shifting component is rotatable.

12. A method of fluorescence imaging based on stimulated emission comprising:
illuminating a plurality of fluorescent markers in a sample with an excitation beam from an excitation source oriented along a first axis such that the plurality of fluorescent markers assume an excited state;
illuminating the plurality of fluorescent markers in the excited state with a stimulation beam from a stimulation source oriented along a second axis, wherein a stimulated emission is generated by the one or more fluorescent markers when illuminated by the stimulation beam, and wherein the stimulated beam and the excitation beam have different wavelengths;
focusing the stimulation beam and the stimulated emission through an objective lens;
attenuating the stimulation beam with a stimulation beam attenuator positioned along the second axis after the objective lens to produce an attenuated stimulation beam;
producing constructive interference between the attenuated stimulation beam and the stimulated emission by phase-shifting the stimulated emission relative to the attenuated stimulation beam; and
imaging the stimulated emission with a detector.

13. The method of claim 12 further comprising focusing the stimulated emission using a lens onto the detector.

14. The method of claim 12 further comprising:
relaying the stimulated emission from the objective lens to an additional lens; and
focusing the stimulated emission onto the detector using the additional lens.

15. A method of fluorescence imaging based on stimulated emission comprising:
illuminating a plurality of fluorescent markers in a sample with an excitation beam from an excitation source oriented along a first axis such that the plurality of fluorescent markers assume an excited state;
illuminating the plurality of fluorescent markers in the excited state with a stimulation beam from a stimulation source oriented along a second axis, wherein a stimulated emission is generated by the one or more fluorescent markers when illuminated by the stimulation beam, and wherein the stimulated beam and the excitation beam have different wavelengths;
focusing the stimulation beam and the stimulated emission through an objective lens;
attenuating the stimulation beam with a stimulation beam attenuator positioned along the second axis after the objective lens;
producing constructive interference between a reference beam and the stimulated emission by inducing a relative phase shift between the reference beam and the stimulated emission; and
imaging the stimulated emission with a detector.

16. The method of claim 15 wherein attenuating the stimulation beam includes producing an attenuated stimulation beam, and wherein producing constructive interference between the reference beam and the stimulated emission includes producing constructive interference between the attenuated stimulation beam and the stimulated emission.

17. The method of claim 16 wherein attenuating the stimulation beam includes passing a portion of the attenuation beam through a gray filter.

18. The method of claim 16 wherein attenuating the stimulation beam includes focusing the stimulation beam onto a beam block having a central pinhole aperture, the beam block being optically opaque to the stimulation beam, and passing a portion of the stimulation beam through the central pinhole aperture to provide the attenuated stimulation beam.

19. The method of claim 15 wherein inducing the relative phase shift between the reference beam and the stimulated emission includes passing at least one of the reference beam and the stimulated emission through a phase adjusting plate.

20. A fluorescence imaging system comprising:
an excitation source configured to generate an excitation beam to illuminate a sample containing a plurality of fluorescent markers, the excitation beam having a first wavelength in an absorption band of the plurality of fluorescent markers and configured to excite the plurality of fluorescent markers into an excited state;
a stimulation source configured to generate a collimated stimulation beam to further illuminate the sample, the stimulation beam having a second wavelength in an emission band of the plurality of fluorescent markers and configured to stimulate the plurality of fluorescent markers in the excited state to produce a stimulated emission;
an objective lens constructed and arranged to receive the stimulation beam and the stimulated emission;
a phase shifting and attenuation apparatus configured to receive the stimulation beam and the stimulated emission from the objective lens, to attenuate the stimulation beam, and to induce a relative phase shift between a reference beam and the stimulated emission, thereby causing constructive interference between the reference beam and the stimulated emission;
a detector configured to receive and image the stimulated emission; and
an optical apparatus positioned between the objective lens and the detector and configured to focus the stimulated emission onto an image plane at the detector.

21. The fluorescence imaging system of claim 20 wherein the phase shifting and attenuation apparatus includes a phase adjusting plate having an attenuation region positioned at a back focal plane of the objective lens, the attenuation region being configured to attenuate the stimulation beam.

22. The fluorescence imaging system of claim 21 wherein the phase adjusting plate is further configured to phase-shift the stimulated emission, thereby inducing the relative phase shift between the reference beam and the stimulated emission.

23. The fluorescence imaging system of claim 21 wherein the attenuation region includes a gray filter.

24. The fluorescence imaging system of claim 20 wherein the reference beam is the attenuated stimulation beam.

25. The fluorescence imaging system of claim 24 wherein the phase shifting and attenuation apparatus includes:
a stimulation beam attenuator positioned at a back focal plane of the objective lens and configured to attenuate the stimulation beam to produce an attenuated stimulation beam; and
a phase adjusting plate positioned between the stimulation beam attenuator and the detector.

26. The fluorescence imaging system of claim 25 wherein the phase adjusting plate is further configured to phase-shift the stimulated emission and includes a central aperture that passes the attenuated stimulation beam.

27. The fluorescence imaging system of claim 25 wherein the stimulation beam attenuator includes a stimulation beam block having a central pinhole aperture and arranged to pass a portion of the stimulation beam through the central pinhole to produce the attenuated stimulation beam.

28. The fluorescence imaging system of claim 20 wherein the optical apparatus includes an optical relay positioned between the stimulation beam attenuator and the phase adjusting plate, and a lens positioned between the phase adjusting plate and the detector and configured to focus the stimulated emission onto the image plane.

29. The fluorescence imaging system of claim 20 wherein the stimulation source and the objective lens are arranged along a first axis, the stimulation source being configured to direct the stimulation beam along the first axis, and wherein the excitation source is arranged and configured to direct the excitation beam along a second axis orthogonal to the first axis.

30. A method of fluorescence imaging based on stimulated emission comprising:
exciting a plurality of fluorescent markers associated with a sample into an excited state;
illuminating the sample with a stimulation beam to stimulate the plurality of fluorescent markers in the excited state to produce a stimulated emission;
attenuating the stimulation beam transmitted through the sample to produce an attenuated stimulation beam;
inducing a relative phase shift between the attenuated stimulation beam and the stimulated emission to provide constructive interference between the attenuated stimulation beam and the stimulated emission;
focusing the stimulated emission onto an image plane; and
detecting the stimulated emission with an imaging detector located at the image plane.

31. The method of claim 30 wherein exciting the plurality of fluorescent markers includes illuminating the sample with an excitation beam having a wavelength within an absorption band of the plurality of fluorescent markers.

32. The method of claim 30 further comprising collecting and focusing the stimulated emission and the stimulation beam transmitted through the sample with an objective lens.

33. The method of claim 32 wherein attenuating the stimulation beam includes intercepting the stimulation beam from the objective lens with a stimulation beam attenuator located at a back focal plane of the objective lens.

34. The method of claim 33 wherein inducing the relative phase shift between the attenuated stimulation beam and the stimulated emission includes transmitting the stimulated emission and the attenuated stimulation beam through a phase adjusting plate configured to phase-shift at least one of the stimulated emission and the attenuated stimulation beam.

35. A method of tracking particle movement comprising:
imaging a stimulated emission produced from fluorescent markers associated with the particles using the method of claim 30; and
analyzing the image to track the movement of the particles.

36. The method of claim 35 wherein the particles are proteins.

37. A method of performing imaging-mode flow cytometry comprising:
imaging a stimulated emission produced from fluorescent markers associated with particles of interest using the method of claim 30; and
analyzing the image to track movement of the particles.

* * * * *